3,069,832
CORN PICKING MACHINE
Donald G. Baker, Box 72, Forrest, Ill.
Filed May 5, 1960, Ser. No. 27,156
4 Claims. (Cl. 56—104)

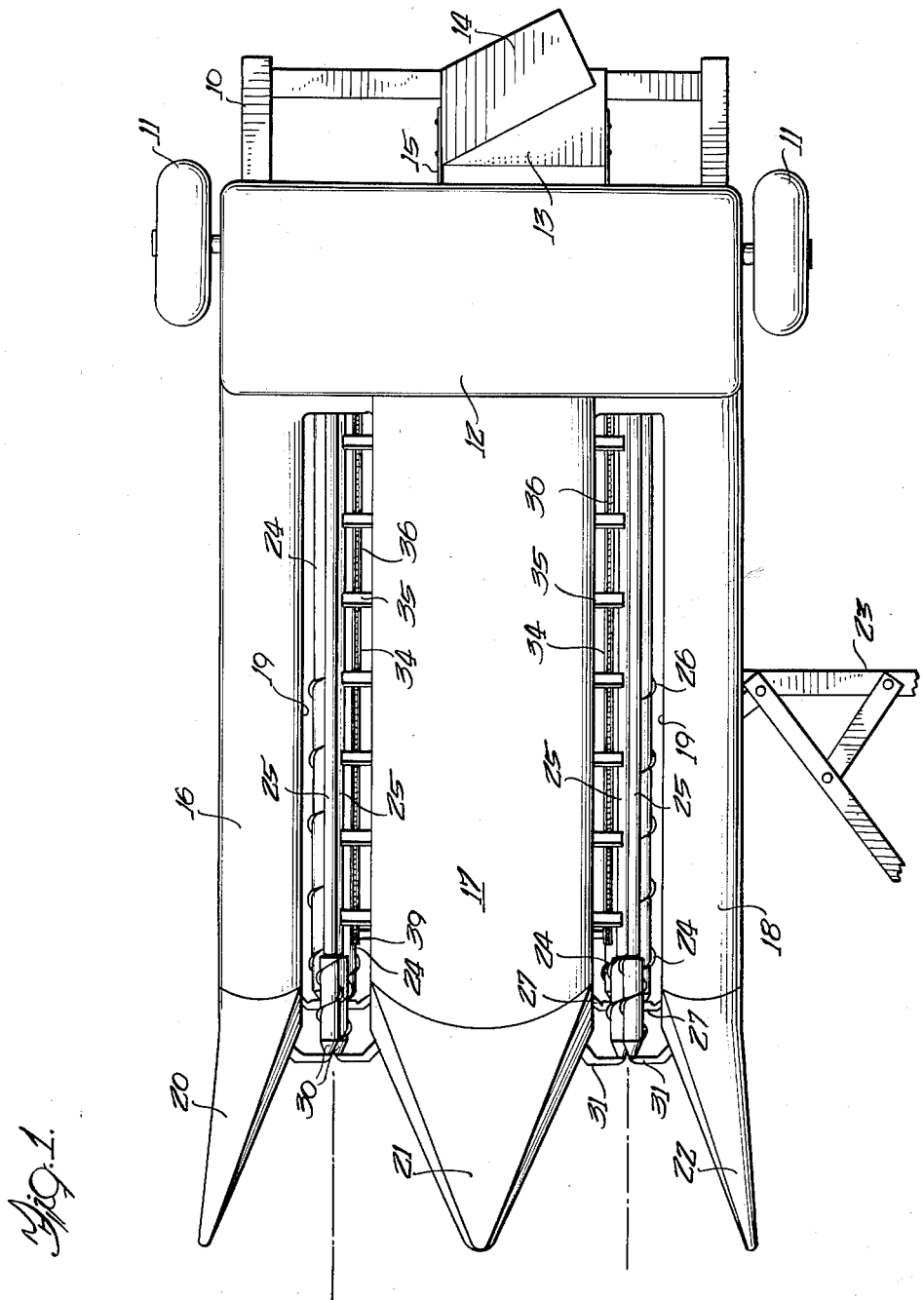

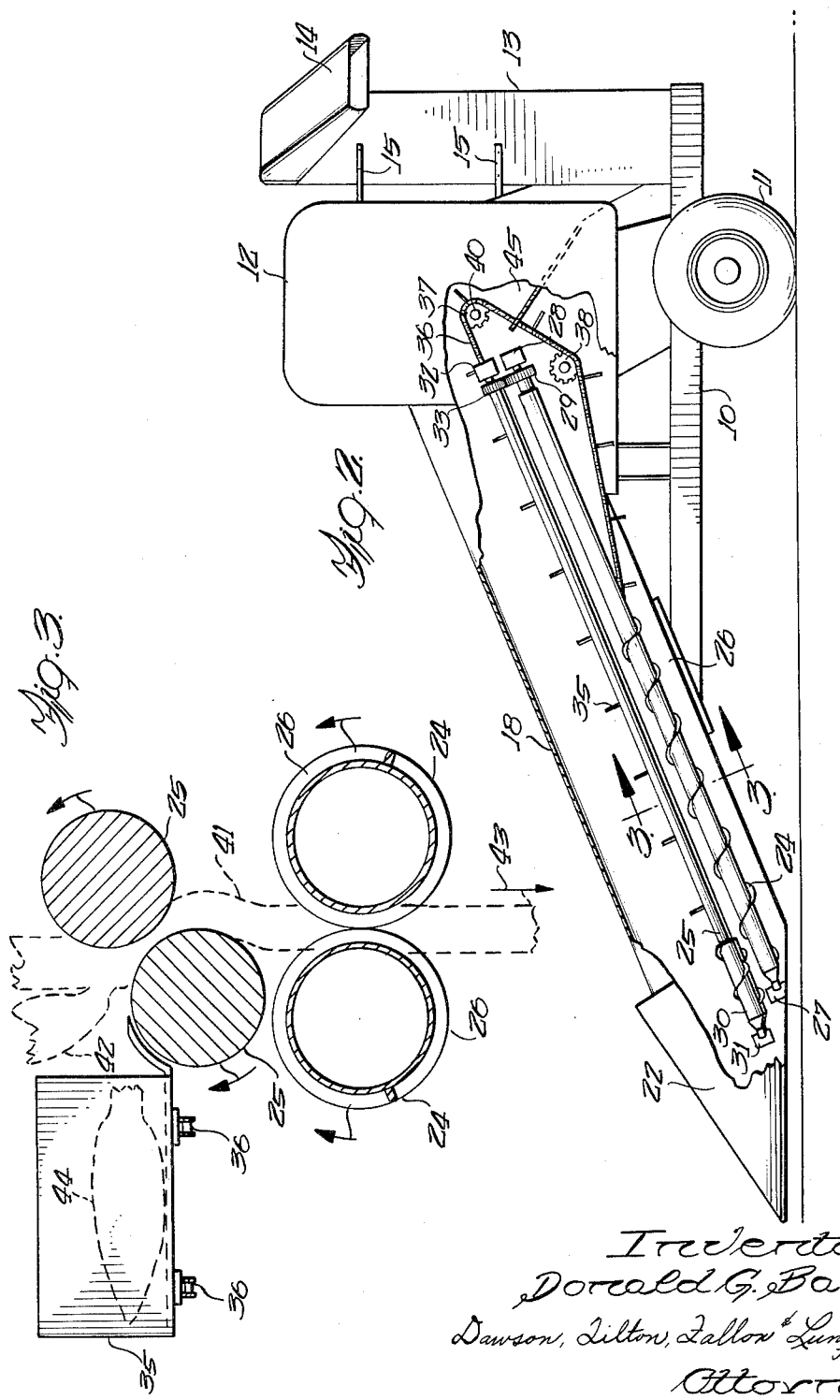

This invention relates to a corn picking machine, and more specifically, to a machine for removing ears of corn from the stalks and for delivering the picked ears to a suitable receptacle.

While it is not new to provide augers for the purpose of drawing stalks into a corn picking machine, most commercial corn picking devices achieve this function by means of lugs carried by endless chains. The lug arrangement has gained considerable preference because it has been thought that augers tend to damage the ears of corn as the stalks are drawn into a machine and as the ears are detached therefrom during a picking operation. The blades of the augers tend to cut into the ears as those ears are broken away from the stalks, thereby damaging the corn and reducing its value. However, in other respects augers are superior to chain-carried lugs. For one thing, augers and their associated elements are simpler in structure and operation than the lug-carrying chains and sprockets and, as a result, tend to be more durable and serviceable. Also, there is less likelihood of jamming and field breakdown in an auger-equipped structure, partially because of its relative simplicity and because there are no chains, sprockets and slip clutches to be shielded from the material handled by the machine.

It is a main object of the present invention to provide an auger-equipped corn picking machine which is adapted to remove ears of corn from their stalks without damaging or bruising those ears. Another object is to provide a corn picking machine in which augers are provided for the sole function of drawing stalks of corn into the machine, the ears of corn being shielded against contact with the augers and being broken from the stalks by other elements of the machine. A further object is to provide a corn picking machine equipped with augers and snapping rollers, the snapping rollers and augers being arranged so that the function of breaking the ears of corn from the stalks is performed entirely by the snapping rollers without damage to the ears. A still further object is to provide a corn picking machine of relatively simple construction which is easily serviced and which is comparatively jam-proof in operation. Still another object is to provide a corn picking machine capable of snapping ears of corn cleanly from their stalks and thereafter bending over the stalks so that they may be easily handled by conventional stalk chopping machines or so that the field may be easily disked following a corn picking operation.

Other objects will appear from the specification and drawings in which:

FIGURE 1 is a top plan view of a corn picking machine embodying the present invention;

FIGURE 2 is a side elevational view, with parts removed, showing the machine of FIGURE 1;

FIGURE 3 is an enlarged cross sectional view taken along line 3—3 of FIGURE 2 and illustrating in broken lines the action of the machine upon a corn stalk and the ears of corn attached thereto.

The corn picking machine illustrated in the drawings is provided with a frame 10 equipped with at least one pair of side wheels 11. Mounted upon the frame above the wheels is an engine housing 12. An elevator 13 equipped with a discharge chute 14 is disposed behind the motor housing and may be connected thereto by straps 15.

The machine illustrated in the drawings is adapted to pick corn from two rows at the same time and, for that purpose, is provided with three guide elements 16, 17 and 18 extending downwardly and forwardly from the engine housing and defining therebetween a pair of longitudinally elongated chambers 19 open along their top and bottom sides. The parallel chambers or passages are spaced laterally apart a distance substantially the same as the distance between adjacent rows of corn. All of the guide elements may be in the form of hollow shells formed from sheet metal or any other suitable material. Side elements 16 and 18 are substantially the same, one being a mirror image of the other, while the central element 17 is substantially wider than the side elements and bridges the space between passages or chambers 19. Tapered guide extensions 20, 21 and 22 are provided at the lower forward ends of elements 16–18 respectively, the extensions being provided with opposing and forwardly diverging side walls for guiding corn stalks into the passages or chambers 19 as the machine is advanced. All of the guide elements and their extensions are rigidly mounted upon frame 10 and the frame may be provided with a lateral support assembly 23 for connection to a tractor or other suitable vehicle. It will be understood that in operation of the apparatus, the machine will be supported by means of its side hitch so that extensions 20–22 sweep close to the ground surface but are spaced slightly thereabove, as illustrated in FIGURE 2.

Within each chamber 19 are a pair of feed augers 24 and a pair of snapping rollers 25. The augers serve the purpose of drawing stalks into the chambers 19 while the snapping rollers act to break or snap ears of corn off of the stalks. Since the structures within each of the two chambers 19 are substantially identical, only one such mechanism will be described in detail.

Feed augers 24 comprise a pair of parallel shafts having spiral ribs 26 extending along major proportions of the lengths thereof. More specifically, each auger has a spiral rib extending from its front end to a point disposed behind the auger's longitudinal mid-point. The rear portion of each auger is of smooth cylindrical shape and has a diameter substantially smaller than the diameter of the spiral rib 26. The tapered lower ends of the augers are rotatably carried by journal members 27 disposed between extensions 21 and 22 at the mouth of chamber 19. The length of the augers is substantially the same, or no less than, the length of the chamber 19. As shown in the drawings, augers 24 extend upwardly and rearwardly and are rotatably supported at their upper ends by journal elements 28. Each pair of augers have intermeshing gears 29 adjacent their upper ends and are mechanically interconnected with the engine housed within casing 12 for simultaneous rotation in opposite directions as indicated by the arrows in FIGURE 3.

The two snapping rollers 25 are parallel with the augers 24 and are disposed directly thereabove. As shown most clearly in FIGURE 3, the snapping rollers are disposed in side-by-side relation although the outermost roller has its axis slightly above the rotational axis of the innermost roller. The snapping rollers are provided with smooth cylindrical surfaces along major proportions of their lengths but, as seen in FIGURES 1 and 2, the lower portions of these rollers are provided with auger extensions 30 of generally the same diameter but of substantially shorter length than augers 24. Journal members 31 and 32 at the front and rear ends of the snapping rollers rotatably support those rollers upon the frame of the machine. Gears 33 near the upper rear ends of the two snapping rollers connect those rollers for simultaneous rotation in opposite directions and also connect them for rotation by the power plant of the machine.

Between the snapping rollers 25 and guide 17 are a pair of conveyers 34, one disposed on each side of the guide. Each inclined conveyer comprises a plurality of scoops 35 carried by chains 36 which extend about sprockets 37, 38 and 39. Upon rotation of the power driven shaft 40 to which sprockets 37 are affixed, endless chains 36 are rotated to advance scoops 35 upwardly along snapping rollers 25.

In operation, the machine is advanced slowly with its longitudinal chambers 19, and hence its augers and snapping rollers, in alignment with rows of corn stalks. The stalks are directed into the mouths of the chambers by the converging walls of guide extensions 20, 21 and 22. When the base portion of a stalk engages the rotating augers 24 and the auger portions 30 of snapping rollers 25, the stalk is guided rearwardly so that its lower portion is disposed between the paired augers and the paired snapping rollers. While the augers tend to pull the stalk rearwardly with reference to the machine, the machine is preferably advanced at a speed at least as great, and preferably greater, than the rearward movement of the stalk induced by the feed augers. Thus, as the machine moves forwardly, the stalk tends to bend forwardly and slide out from between the rollers beneath the advancing machine.

The broken lines 41 between the rollers 25 and augers 24 shown in FIGURE 3 represent a stalk just prior to the removal of an ear of corn 42 therefrom. As the stalk moves in the direction of arrow 43, ear 42 is brought into contact with the smooth outer surfaces of snapping rolls 25. The snapping rolls, upon contact with the ear, snap off the ear at its point of connection with the stalk and, since the outer snapping roll is disposed slightly above the inner roll, the ear of corn is directed inwardly into the path of the upwardly and rearwardly advancing scoops 35. The detached ear thus drops into a scoop, as represented by numeral 44 in FIGURE 3, and is conveyed upwardly and rearwardly to the point where the scoop passes over drive sprockets 40. At that point, the ear falls into chute 45 which directs it into power driven elevator 13.

An important aspect of the present invention lies in the fact that the operation of breaking the ears away from the stalks is performed entirely by the smooth-surfaced rear portions of the snapping rollers 25. The augers 24 which direct the stalks into proper positions for the snapping operation perform no direct function in breaking the ears off of the stalks. Thus, damage to the ears which might otherwise be caused by the spiral ribs thereof is entirely avoided.

The absence of spiral ribs from the rear portions of the feed augers 24 is important for the purpose of avoiding jamming of the apparatus. As brought out above, stalks are withdrawn from between the augers and the snapping rollers by forward movement of the machine. Should such forward movement cease, continued rotation of the feed augers would quickly urge the stalks upwardly to jam the gears 29 and 33 if it were not for the fact that the spiral ribs terminate shortly beyond the longitudinal mid-point of the feed augers. Because of this construction, an operator may permit the stationary machine to "run out" and then, by discontinuing auger rotation and advancing the entire apparatus, can easily extract all stalks from between the feed augers and snapping rollers.

It is believed apparent that the simplicity of the present structure results in a machine which is extremely rugged and readily serviceable. The augers have little if any tendency to jam in use since their operation does not require their bodily movement with reference to other elements of the machine.

While I have disclosed an embodiment of the present invention in considerable detail for purposes of illustration, it will be understood by those skilled in the art that many of these details may be varied without departing from the spirit and scope of the invention.

I claim:

1. In a corn picking machine, a pair of rotatable inclined feed augers being disposed in spaced parallel side-by-side relation and having spiral ribs extending upwardly from their lower ends substantial portions of their lengths for drawing corn stalks upwardly and rearwardly therebetween as said augers are rotated, and a pair of rotatable snapping rollers disposed in spaced relation above said feed augers and in parallel relation therewith, said snapping rollers each being provided with relatively smooth cylindrical surfaces along the upper portions thereof for snapping ears of corn from stalks drawn therebetween by said feed augers and being provided with spiral ribs along the lower portions thereof for guiding stalks towards said smooth cylindrical upper portions.

2. In a corn picking machine, a frame, a pair of rotatable feed augers arranged in side-by-side relation and having spiral ribs extending upwardly from their front ends to substantially intermediate disposed points for drawing corn stalks therebetween as said augers are rotated, said augers being substantially smooth and cylindrical above and behind said intermediate points, a pair of spaced rotatable snapping rollers disposed above said feed augers and parallel therewith, said snapping rollers and said feed augers being rotatably supported by said frame, said snapping rollers each being provided with a relatively short front portion and a relatively long rear portion, said front portion being provided with spiral ribs and said rear portion being provided with a smooth cylindrical surface for snapping ears of corn from stalks drawn therebetween by said feed augers, and conveyer means extending alongside said snapping rollers for receiving and carrying away ears of corn snapping from their stalks by said rollers.

3. The structure of claim 2 in which said feed augers and said snapping rollers have their axes disposed in parallel inclined relation.

4. A corn picking machine comprising a pair of spaced inclined guide elements defining an elongated chamber therebetween, said elements being provided with tapered extensions at the lower front ends thereof for directing corn stalks into said chamber as said machine is advanced, a pair of feed augers rotatably mounted in side-by-side relation within said chamber for drawing stalks upwardly and rearwardly therealong as said augers are rotated, and a pair of inclined snapping rollers rotatably mounted above said feed augers and in parallel relation therewith for snapping ears of corn from stalks drawn therebetween by said feed augers, each of said snapping rollers being provided with a smooth cylindrical surface along a major proportion of its length and with spiral ribs adjacent the lower front end portion thereof, and each of said feed augers being provided with a spiral rib extending upwardly a major proportion of the auger's length from the lowermost end thereof.

References Cited in the file of this patent

UNITED STATES PATENTS

| | | |
|---|---|---|
| 2,234,447 | Norman | Mar. 11, 1941 |
| 2,870,593 | Anderson | Jan. 27, 1959 |